United States Patent
Breininger et al.

(10) Patent No.: US 11,905,966 B2
(45) Date of Patent: Feb. 20, 2024

(54) COMPRESSOR WHEEL ARRANGEMENT AND METHOD FOR THE PRODUCTION OF A COMPRESSOR WHEEL ARRANGEMENT

(71) Applicant: BorgWarner Inc., Auburn Hills, MI (US)

(72) Inventors: Timo Breininger, Rhineland Palatinate (DE); Dietmar Metz, Meckenheim (DE); Niclas Schenkenberger, Rhineland Palatinate (DE); Michael Schoeps, Thuringia (DE); Daniel Speller, Kaiserslautern (DE)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 17/822,575

(22) Filed: Aug. 26, 2022

(65) Prior Publication Data

US 2023/0068110 A1 Mar. 2, 2023

(30) Foreign Application Priority Data

Aug. 31, 2021 (EP) ..................................... 21193910

(51) Int. Cl.
| | |
|---|---|
| F04D 29/26 | (2006.01) |
| F04D 17/10 | (2006.01) |
| F04D 25/06 | (2006.01) |
| F04D 29/02 | (2006.01) |
| F04D 29/28 | (2006.01) |
| F04D 29/62 | (2006.01) |
| B23P 15/04 | (2006.01) |
| F04D 29/053 | (2006.01) |

(52) U.S. Cl.
CPC ............ *F04D 29/266* (2013.01); *B23P 15/04* (2013.01); *F04D 17/10* (2013.01); *F04D 25/0606* (2013.01); *F04D 29/023* (2013.01); *F04D 29/053* (2013.01); *F04D 29/284* (2013.01); *F04D 29/624* (2013.01); *F05D 2220/40* (2013.01)

(58) Field of Classification Search
None
See application file for complete search history.

(56) References Cited

U.S. PATENT DOCUMENTS

| | | | |
|---|---|---|---|
| 6,145,314 A | 11/2000 | Woollenweber et al. | |
| 9,664,050 B2* | 5/2017 | Hippen | F01D 25/166 |
| 9,941,771 B2* | 4/2018 | Garrard | H02K 21/16 |
| 10,920,783 B2* | 2/2021 | Lee | F04D 29/053 |
| 2008/0163622 A1* | 7/2008 | Schlegl | F01D 25/16 60/599 |
| 2015/0118044 A1* | 4/2015 | Hippen | F01D 15/10 415/229 |
| 2018/0069451 A1* | 3/2018 | Garrard | H02K 1/02 |

(Continued)

*Primary Examiner* — Juan G Flores
(74) *Attorney, Agent, or Firm* — Howard & Howard Attorneys PLLC

(57) ABSTRACT

A compressor wheel arrangement for an electrically powered turbocharger, which can be connected with a rotor shaft of the turbocharger, having a compressor wheel made of a first metallic material, a shaft made of a second metallic material, which is tightly connected with the compressor wheel, at least one permanent magnet, which is non-rotatably arranged on the section of the shaft, in a ring-shaped area around a section of the shaft that extends behind the compressor wheel, between a casing and the shaft.

9 Claims, 5 Drawing Sheets

(56) References Cited

U.S. PATENT DOCUMENTS

| | | |
|---|---|---|
| 2019/0285073 A1* | 9/2019 | Lee ................... F04D 25/0606 |
| 2020/0182254 A1* | 6/2020 | Garrard ............ H01M 8/04201 |
| 2021/0172458 A1* | 6/2021 | Oh ......................... F04D 17/10 |

* cited by examiner

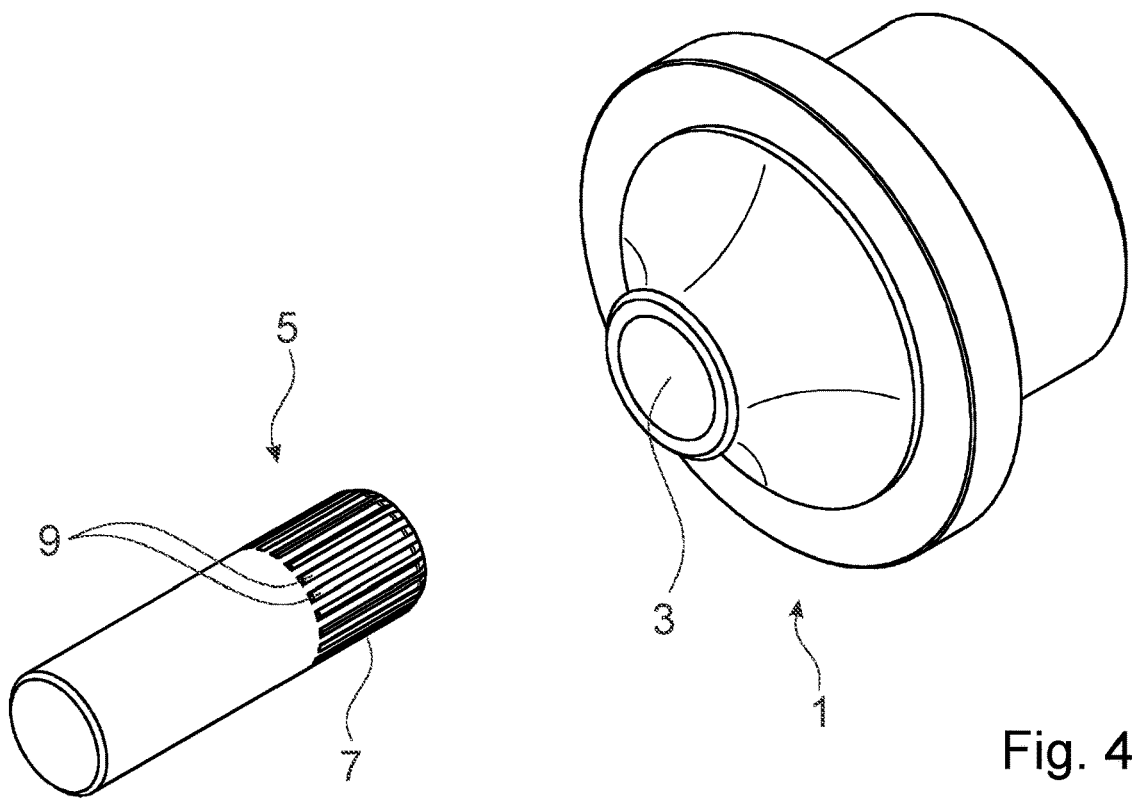
Fig. 4
Fig. 5
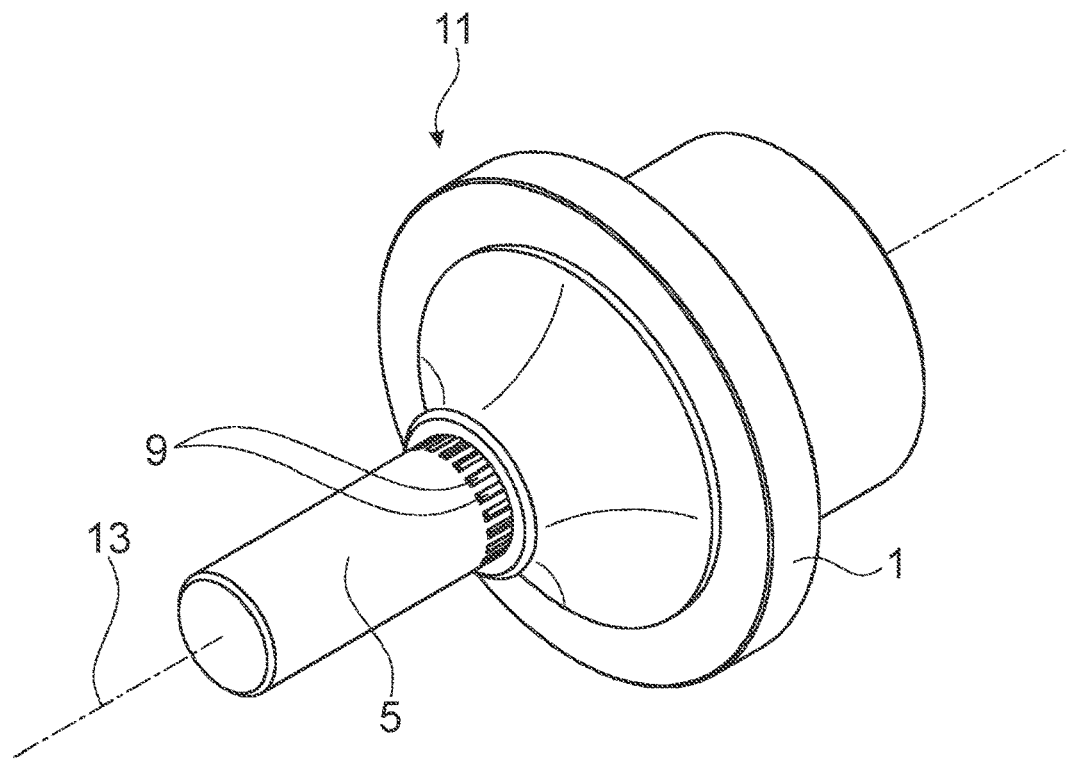
Fig. 6

COMPRESSOR WHEEL ARRANGEMENT AND METHOD FOR THE PRODUCTION OF A COMPRESSOR WHEEL ARRANGEMENT

CROSS-REFERENCE TO RELATED APPLICATIONS

This application claims priority pursuant to 35 U.S.C. 119(a) to European Application No. 21193910.3, filed Aug. 31, 2021, which application is incorporated herein by reference in its entirety.

FIELD

The invention relates to a compressor wheel arrangement for an electrically powered turbocharger, as well as a method for the manufacture thereof.

BACKGROUND

An electrically powered turbocharger, also known as an electro-turbocharger or e-turbocharger for short, has a compressor wheel in order to increase fresh air pressure in the intake system of an internal combustion engine. An electric motor drives the compressor wheel via a shaft. An electrically powered turbocharger can, on the turbine side, also be powered by an exhaust gas flow of an internal combustion engine, so that in this case, the term exhaust turbocharger can also be used. In a conventional electrically powered exhaust turbocharger, a magnet of the electric motor is typically arranged so as to be separated from the compressor wheel and from the turbine wheel on the rotor. The magnet is arranged between bearings in a central section of a rotor shaft between the compressor wheel and the turbine wheel. The magnet can be encapsulated or non-encapsulated. The stators with coils of the electric motor are arranged radially around the magnet and rotate the magnet, and with it the rotor shaft. Alternatively, the magnet can be arranged outside the bearings, or in the area of a fastening nut in the inlet area of the compressor wheel.

CITATIONS

U.S. Pat. No. 6,145,314 shows compressor wheels and magnet modules for charging devices of internal combustion engines.

SUMMARY

In view of the high mechanical stress and speeds of rotation that occur in the electrically powered turbocharger, only low manufacturing tolerances, in the micrometre range, are acceptable in production, in particular production of the compressor wheel and the components connected with it. The individual components must be both precisely manufactured and precisely assembled. Nevertheless, dimensional variations during production and assembly lead to imbalance in the assembled components, and the high requirements for the manufacturing tolerances that must be met lead to extensive effort in balancing and rejecting products.

The object is to specify an improved compressor wheel arrangement and an improved manufacturing method for this.

This object is solved with a compressor wheel arrangement for an electrically powered turbocharger having the features of claim 1.

The compressor wheel arrangement for an electrically powered turbocharger that can be connected to a rotor shaft of the turbocharger comprises a compressor wheel made of a first metallic material, a shaft made of a second metallic material, which is connected tightly to the compressor wheel, and at least one permanent magnet, which is arranged in a ring-shaped area around a section of the shaft, the shaft extending behind the compressor wheel, and the magnet being arranged non-rotatably on said section of the shaft, between a casing and the shaft.

The compressor wheel arrangement is connected to a rotor shaft of a rotor of the turbocharger, in particular in such a way that the rotor shaft runs via the compressor wheel arrangement, so that the compressor wheel and also the magnet are arranged on the front side of the bearing of the rotor shaft.

The compressor wheel is advantageously formed as a single piece, so that a blade section on the front and a back section, for example a hub projection, that engages in the shaft are formed as a single piece. Alternatively, the compressor wheel can be formed of multiple parts, in particular of two parts, so that the blade section and the back section are separate components, which are only joined together during assembly of the complete turbocharger.

The permanent magnet is fixed to the shaft as a component of an electric motor. The magnet is designed so that it, and with it the shaft and the compressor wheel, can be set in rotation by the electric motor.

The casing holds the magnet to the shaft, even at high rotational speeds, and prevents the permanent magnet or magnets being damaged by centrifugal forces. The casing can be formed as a coil around the permanent magnet or magnets or as a sleeve, for example a metal sleeve or fibre sleeve.

Advantageously, the permanent magnet is thermally coupled to the compressor wheel. The thermal coupling allows heat transfer from the permanent magnet to the compressor wheel, which dissipates heat. The thermal coupling can be achieved through contact between the components, or by means for heat transfer, for example an adhesive such as glue or a thermally conductive paste. A component serving as a thermal bridge between the magnet and the compressor wheel is also conceivable, for example a disc made of a suitable material.

In one embodiment, the shaft is connected to the compressor wheel via a friction weld joint, so that the torque of the shaft can be transferred to the compressor wheel.

Advantageously, the compressor wheel is formed of one piece, and the shaft has a first shaft section and a second shaft section, wherein the first shaft section, at the end of the shaft, and a recess of the compressor wheel, in which the first shaft section engages, forms a shaft-hub connection, and the second shaft section extends behind the compressor wheel. The shaft-hub connection is a fixed connection of the kind that means torque can be transferred from the shaft to the hub of the compressor wheel during operation, in order to drive the compressor wheel. The first, end-positioned shaft section is advantageously frictionally connected with the recess, so that the torque generated by the electric motor can be transferred from the shaft to the compressor wheel. This embodiment has few connections and components which need to be joined, which correlates with lower manufacturing tolerances and low imbalance.

Alternatively, the compressor wheel is made in two parts, with a blade section and a hub projection formed as separate components, and the shaft has a first shaft section and first shaft section. The first, end-positioned shaft section and a recess of the hub projection, in which the first shaft section engages, form a shaft-hub connection, and the second shaft section extends behind the compressor wheel. In the two-part compressor wheel, the front blade section with blades and the hub projection on the back, which is connected with the shaft, are separate components, which are connected, at the latest, during installation in the turbocharger. The connection advantageously takes place by means of a rotor shaft, which is connected non-rotatably with the blade section and also with the hub projection, so that the blade section is also driven by the turning shaft, which is tightly connected with the hub projection. The blade section and the hub projection are thermally coupled, for example by contact, an adhesive or a thermally conductive paste.

The shaft-hub connection can, for example, be formed as a press-fit connection or as a shrink fit connection. With the press-fit connection, the shaft is the inside part, frictionally pressed into the recess in the compressor wheel. With the shrink fit connection, at least one of the two components to be joined has been heated, and then the components have been put together, so that they form a fixed connection once they have cooled. Shrinking allows a thermal centring of the component that is to be shrunk.

In one embodiment, the end shaft section is rounded on the front side, which has made it easier to insert while being joined with the recess in the compressor wheel. In one embodiment, the end shaft section has a structure with elevations and/or indentations, in particular a structure with grooves, which have simplified a press fit and/or the shrinking during assembly.

The compressor wheel arrangement is a module that includes both the compressor wheel and components of the electric motor. The module is assembled and balanced before being connected with other components of the electrically powered turbocharger. This pre-balancing makes it easier to comply with manufacturing tolerances and reduces the difficulty of balancing the turbocharger after installing the compressor wheel arrangement. With a two-part compressor wheel, the blade section and the hub projection with integrated shaft can balanced using the rotor shaft before they are connected, first separately and then once connected with the rotor shaft.

A further advantage compared to conventional electrically powered turbochargers is the arrangement of the thermomagnetic sleeve adjacent to the compressor wheel, via thermal coupling. This allows an improved cooling of the permanent magnet and heat dissipation from the permanent magnet through the compressor wheel, in particular where the compressor wheel is made of aluminium or of an aluminium alloy. The compressor wheel arrangement has a permanently better performance.

The integration of the magnet and the compressor wheel in a compressor wheel arrangement goes hand in hand with a compact design with few components. Having few components goes hand in hand with advantages for manufacturing, because manufacturing tolerances, which accumulate with each step of assembly, are then easier to adhere to.

Thus, the compressor wheel arrangement offers advantages for cooling the rotor, for balancing and for the assembly of the turbocharger. In particular, the improved cooling leads to a better engine performance. Fewer unwanted noises, shortened to "NVH" for "noise, vibration, harshness," occur in the vehicle.

In one embodiment, the shaft is formed of a steel material, for example an iron-based one. In particular, the shaft can be ferromagnetic, in order to improve the performance of the electric motor. In one embodiment, the compressor wheel comprises aluminium, for example as an alloy of aluminium, so that the compressor wheel is lightweight and stable.

The permanent magnet is advantageously formed as a hollow cylindrical magnet sleeve, which can be made of one or several parts. Such a sleeve made of magnetic material is easy to mount on the shaft, in that it is pushed up to the back side of the compressor wheel.

In one exemplary embodiment, an adhesive bond is provided between the at least one permanent magnet and the shaft, as well as between the at least one permanent magnet and the compressor wheel. The adhesive bond is applied to at least one of the components to be joined together as an adhesive layer during assembly, for example to the magnet, and forms a fixed connection as well as the thermal coupling once it as hardened. Advantageously, an adhesive bond is also provided between the at least one permanent magnet and the casing.

In the compressor wheel arrangement as a module of an electrically powered turbocharger, which comprises the compressor wheel, the shaft and the components of the electric motor, the compressor wheel and the shaft that drives it can be manufactured separately, then subsequently be connected and fitted onto the components of the electric motor. Considering the high mechanical stress and high rotational speeds that occur in the electrically charged turbocharger, only low manufacturing tolerances, in the micrometre range, are acceptable for the module, in particular for the compressor wheel and the shaft connected to it. The individual components must be both precisely manufactured and precisely assembled. This is achieved by the following method for the production of a compressor wheel arrangement.

The method for the production of a compressor wheel arrangement for an electrically powered turbocharger comprises: forming a blank by joining a first component made of a first metallic material and a second component made of a second metallic material, so that the two components extend along a longitudinal axis of the blank, processing the blank by means of material-removing methods steps in the same clamping process, to produce a compressor wheel with a shaft protruding from its rear face out of the first or second components respectively, or to produce a hub projection of an at least two-part compressor wheel with a shaft protruding from its rear face out of the first or second components respectively, arranging at least one permanent magnet in a ring-shaped area around a shaft section, which extends behind the compressor wheel, so that the at least one permanent magnet is non-rotatably arranged on the shaft section between a casing and the shaft, and is thermally coupled with the compressor wheel.

Processing the blank comprises at least two material-removing method steps being carried out in the same clamping process, so that manufacturing tolerances can be more easily adhered to, as the product does not have to be re-clamped between steps. Such steps can be turning steps, drilling steps or milling steps.

The first component and the second component can be connected by friction welding. Alternatively, the second component has an end region, and the first component has a recess, so that the end region that engages in the recess and the recess form a shaft-hub connection of the compressor wheel arrangement that is to be manufactured. The shaft-hub connection can be formed by press connection or shrink fitting, in order to form a fixed connection. Both pressing and heat-shrinking allow good centring during the assembly of the first components, from which the future compressor wheel is formed.

Arranging the at least one permanent magnet can preferably comprise adhesion, so that the adhesive forms a thermal coupling between the at least one permanent magnet and the compressor wheel. When arranging the at least one permanent magnet, magnetisation can also occur after the arrangement of the component provided as the magnet.

The compressor wheel can be milled either before or after the arrangement of the at least one permanent magnet and the casing, so there is a degree of freedom for the design of the manufacture.

The subjects and methods described above have a permanent magnet for an electric motor, in order to drive the shaft. The described ideas for the embodiment of the subjects and methods can be transferred to other electric motors, which are different from the subjects and methods described above in that no permanent magnet is provided. An example for this is a reluctance machine as a design of an electric motor, in which the torque in the rotor is exclusively generated by magnetic reluctance energy. Instead of a permanent magnet, a laminated core is provided in such a reluctance machine. Besides this, the compressor wheel arrangement and the blank for the manufacture thereof are unchanged.

The above method reduces dimensional variations, in particular in the manufacture of the compressor wheel with a shaft protruding from its rear face, in order to reduce the effort of balancing and rejecting. The manufacture takes place from a blank for the machining manufacture of the one-part compressor wheel with integrated shaft or for the machining manufacture of the hub projection with integrated shaft, which is part of the multi-part compressor wheel.

The fixed connection, in particular as a shaft-hub connection of the future compressor wheel and the future shaft, is already formed in the blank for the machining manufacture of the compressor wheel with integrated shaft.

The blank comprises a first component made of a first metallic material, with a recess in which an end region of a second component made of a second metallic material engages, so that the end region and the recess form a press-fit connection and the second component extends along a longitudinal axis of the blank, the longitudinal axis also running through the recess.

The production of the compressor wheel with the integrated shaft from the blank, in which the components are already connected before the machining manufacturing steps, and from which the compressor wheel and the shaft are made, make it easier to comply with the pre-determined manufacturing tolerances, and thereby to lower the effort required for the balancing process, and reduce waste.

Besides the fact that the linking step is preferred and the hybrid blank made in this way is then worked on via machining manufacturing methods, the further steps of the production process with turning and milling, as well as balancing of the module, are similar to those of a conventional production. By using the above-described blank, the upper surfaces of the compressor wheel can be made with an integrated shaft in the same clamping process. The machining of this blank allows the simultaneous production of the compressor wheel and the shaft in the same manufacturing steps. The pre-determined manufacturing tolerances can be observed, as dimensional variations that accumulate with several manufacturing steps for separate components and several clamping steps are avoided. In this way, the pre-determined manufacturing tolerances can be more easily observed. Imbalance is also lower. The module has better radial and axial run-out properties and can be more easily balanced. Overall, manufacture, in particular the assembly, is made easier, or, in a module with very high requirements for the manufacturing tolerances that need to be complied with, is made possible for the first time. Balancing the module components that turn at high speed is made easier. This reduces the expense for the manufacture of the compressor wheel with integrated shaft and correlates with a saving of costs.

The recess in the first component is advantageously made as a blind hole. A through-hole would also be conceivable. In one embodiment of the hybrid blank manufactured for the chipping steps, said blank being made of different materials, the second component is steel, as an example of a ferromagnetic material based on iron, and the first component comprises aluminium. The first, advantageously rotationally symmetrical components and the advantageously stick-shaped, in particular cylindrical second component that is pressed into the first, are integrated into the blank. The end region of the second component, which has been pressed into the recess, can have an identical or almost identical diameter as the region on the other side of the end region. Alternatively, the end region can have a larger diameter, or can be a conical end region, with a lower diameter. The first component can have a disc-shaped original form, whose highest diameter is larger than the highest thickness. Such a disc is referred to as a circular blank. The cross-sectional edge of the disc can be straight, or have a curved shape similar to the outer contour of the compressor wheel with integrated shaft which is to be manufactured, but also extends beyond said contour, so that to form the outer contour, all that is needed is to remove a small amount of material. A pre-made disc of this kind can, in a rather improbable ideal situation, already have the outer contour of the compressor wheel to be manufactured, so that the removal of material in the first component is minimised and is limited to the later creation of the blades. Due to the manufacturing tolerances, there is, however, usually an allowance needed on the first component.

Advantageously, the end region of the second component, which is pressed into the first component, has a structure with elevations and/or indentations, in particular a groove-like structure, in order to absorb the torque, which, in manufacturing the compressor wheel with integrated shaft, appears between the components of the blank. The groove-like structure can be formed as an external toothing with longitudinal grooves. Alternatively, the end region surface can, for example, include knurling. The design of the end region is not limited to a groove-like shape. In one embodiment, a polygonal end region cross-section of the second component can be provided. An end region that is rounded on the front side simplifies insertion of the second component at the start of the components being pressed together.

In the compressor wheel with integrated shaft for an electrically powered turbocharger, which is machine-manufactured from the blank, the press-fit connection forms a shaft-hub connection between the shaft, made of the second material, and the compressor wheel, made of the first material, said shaft-hub connection being suitable to transfer a torque from the shaft to the hub of the compressor wheel during operation, in order to drive the compressor wheel.

A method for manufacturing a compressor wheel with integrated shaft for an electrically powered turbocharger has the following steps: formation of a blank through assembly of a first component made from a first metallic material with a recess, and a second component made from a second metallic material, which has an end region, so that the end region that engages in the recess and the recess form a press-fit connection and the second component extends along a longitudinal axis of the blank, which also runs through the recess, and machining of the blank through a chip-removing process, in the same clamp, to produce the compressor wheel with integrated shaft for an electrically powered turbocharger.

In contrast to conventional production, a hybrid blank is initially formed, in which a steel rod, as a second component, is pressed into an aluminium disc, which is the first component. After turning the outer contours of the compressor wheel and shaft device that is to be manufactured, which has the compressor wheel with integrated shaft, and boring a recess running along in the shaft, assembling this with further components of the electric motor follows. The shaft is placed in a hollow cylindrical magnet, which is arranged with washers in a carbon sleeve as a casing. Alternative materials for the sleeve are glass fibres or metals, for example titanium or nickel-based alloys. A casing can, for example, be created by wrapping, press fitting or shrink fitting. Subsequently, the compressor wheel blades are milled, and the whole module is balanced. In an alternative approach, milling the compressor wheel blades comes before assembly with further components.

BRIEF DESCRIPTION OF THE DRAWINGS

Some exemplary embodiments are, on the basis of the drawing, illustrated in more detail below. Here are shown.

DETAILED DESCRIPTION

Figure 1:
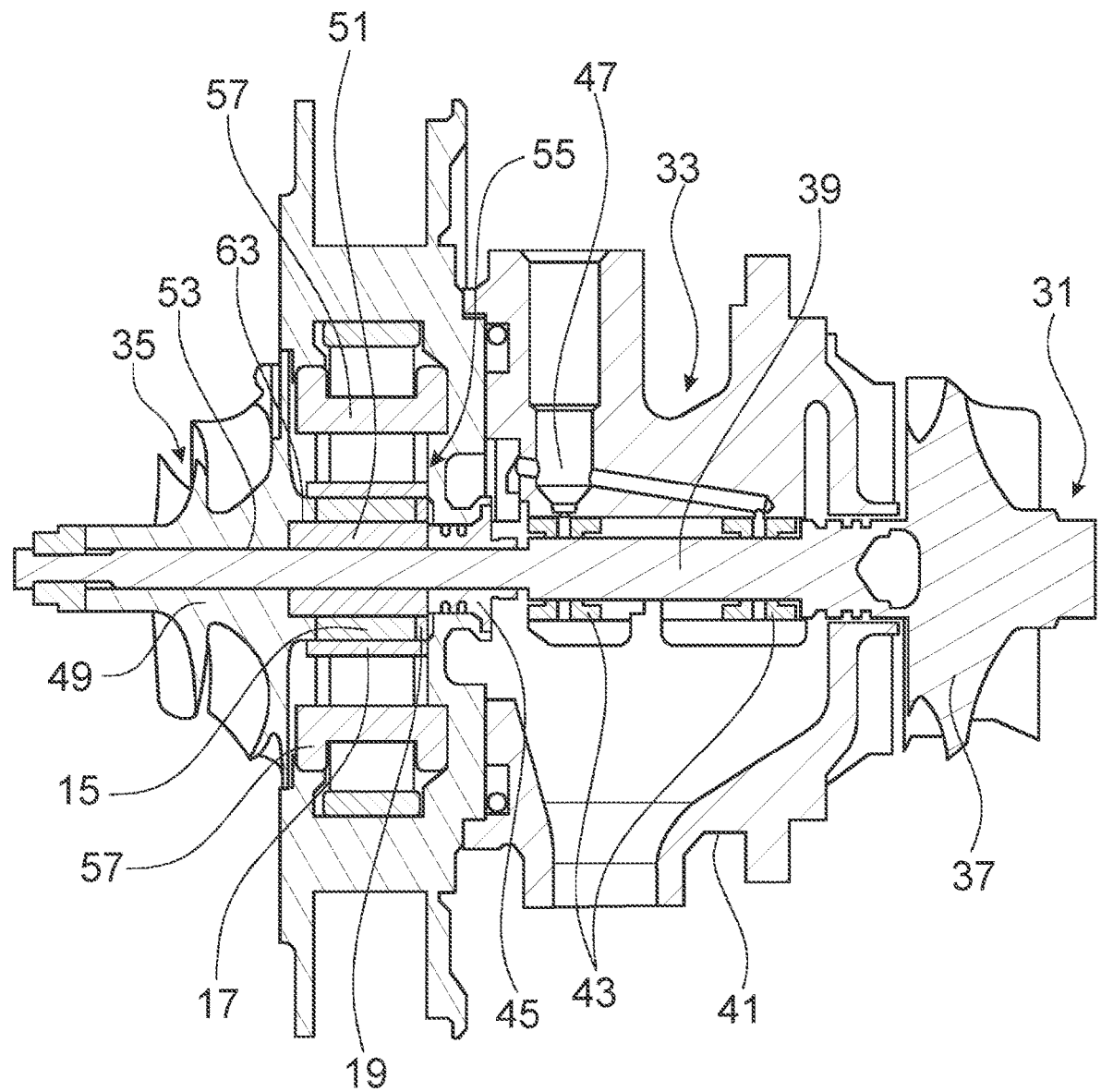
FIG. 1 a sectional representation of a central region of an exemplary embodiment of an electrically powered turbocharger, FIG. 2 a sectional representation of an exemplary embodiment of a compressor wheel arrangement, FIG. 3 a sectional representation of a further exemplary embodiment of a compressor wheel arrangement, FIG. 4 a three-dimensional representation of an exemplary embodiment of a first component of a blank, FIG. 5 a three-dimensional representation of an exemplary embodiment of a second component of a blank, FIG. 6 a three-dimensional representation of an exemplary embodiment of a blank with bonded first and second components, FIG. 7 a three-dimensional representation of the further processed exemplary embodiment of a blank, FIG. 8 a three-dimensional sectional view of an exemplary embodiment of a module with the further processed exemplary embodiment of a blank and further components, FIG. 9 a further exemplary embodiment of a compressor wheel arrangement in an exploded view, and FIG. 10 a sectional view of a further exemplary embodiment of a compressor wheel arrangement.

In the figures, components that are identical or have the same functional effect are labelled with the same reference numerals.

FIG. 1 shows a sectional representation of a central region of an exemplary embodiment of an electrically powered turbocharger. For the compressor and the turbine, the depiction focuses on a compressor wheel 49 and a turbine wheel 37 respectively. The surrounding compressor housing or turbine housing are, for the sake of clarity, not depicted.

The turbocharger comprises a rotor 31, which is rotatably mounted in a bearing apparatus 33. The rotor 31 comprises a compressor wheel arrangement 35, the turbine wheel 37 and a rotor shaft 39, the rotor shaft connecting the turbine wheel 35 with the compressor wheel arrangement 35. The bearing apparatus 33 comprises a bearing housing 41, in which radial and axial bearings 43, 45 for the rotor shaft 31 are arranged, as well as an oil feed 47, in order to provide an oil film for the bearings 43, 45.

The compressor wheel arrangement 35 comprises the compressor wheel 49 with integrated shaft 51, the shaft extending behind the compressor wheel 49 and being shorter than the rotor shaft 39. The term "integrated shaft" refers to the fixed connection, here as a shaft-hub connection 63, between compressor wheel 49 and shaft 51. A cylindrical recess 53 extends along a longitudinal axis of the compressor wheel arrangement 35. The rotor shaft 39 runs from the turbine wheel 37 through the bearing apparatus 33 and the compressor wheel arrangement 35. The latter is arranged outside the bearing apparatus 33 and is non-rotatably connected with the rotor shaft 39.

An electric motor 55 is arranged between the compressor wheel 49 and the bearing apparatus 33, said electric motor comprising stators 57 with coils and a sleeve-shaped permanent magnet 15. The magnet 15 is arranged non-rotatably on the shaft 51 of the compressor wheel arrangement 35. It is enclosed by a sleeve-shaped casing 17 on the outside, and covered by a covering disc 19 at the ends. The stators 57 with coils are arranged radially around the sleeve-shaped magnet 15.

During the operation of the turbocharger, the rotation of the turbine wheel 37, which is powered by exhaust gases from an internal combustion engine, causes the rotation of the compressor wheel 49, with which the air fed into the internal combustion engine is compressed. The rotation of the turbine wheel 37 is transferred to the compressor wheel arrangement 35 via the rotor shaft 39. The rotation of the compressor wheel can additionally or alternatively be caused by the electric motor 55, in which changing fields in the stators 57 set the permanent magnet 15, and with it the shaft 51 and the whole rotor 31 in rotation.

Figure 2:
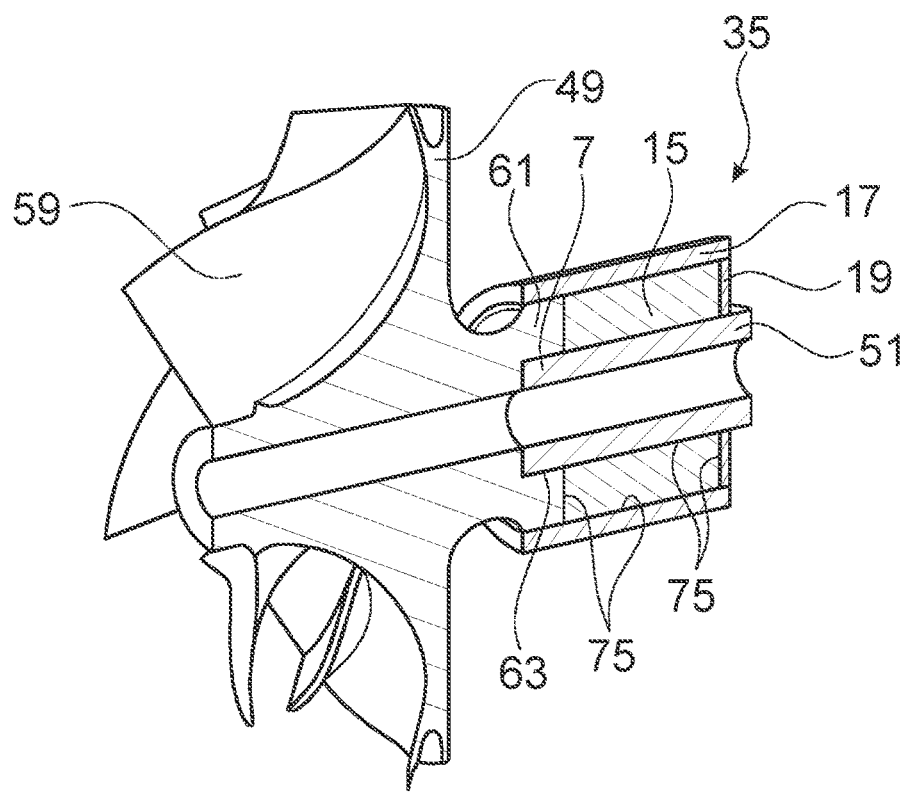

FIG. 2 shows a sectional representation of an exemplary embodiment of a compressor wheel arrangement 35 with a compressor wheel 49 and a shaft 51.

The shaft 51 is formed of a ferromagnetic material and is in particular steel and hollow. The compressor wheel 49 is made of aluminium or a material comprising aluminium. The compressor wheel 49 has a recess that goes right through it. The compressor wheel 49 has blades 59 on its front side, said blades being designed to compress air that is fed into the internal combustion engine. A hub projection 61 extends on the back of the compressor wheel 49, the inner diameter of which is widened in steps at the front. A section 7 at the end of the shaft 51 engages in the widened recess, so that a shaft-hub connection 63 is formed, which is designed to transfer the torque from the shaft 51 to the compressor wheel 49. Such a shaft-hub connection 63 can, for example, be formed as a press-fit connection or as a shrink fit connection, also called a press fit or shrink fit. With the press-fit connection, the engagement of the end region 7 in the recess accompanies a deformation, which leads to a force-fitting connection. With the shrink fitting, the components are assembled once heated, and the cooling leads to shrinking, and with it a force-fitting, fixed connection.

A sleeve-shaped permanent magnet 15 is arranged next to the shaft-hub connection 63 on the shaft 51, so that the facing end sides of the magnet 15 and the hub projection 61 of the compressor wheel 49 are adjacent. The magnet 15 and the compressor wheel 49 are thermally coupled. This can occur due to contact of the components or due to a thermal coupling agent. A covering disc 19 is arranged on the side of the permanently magnetic sleeve facing away from the compressor wheel 49. On the outside of the sleeve-shaped permanent magnet 15, a hollow cylindrical casing 17 is provided, which also extends over the covering disc 19 and the hub projection 61 of the compressor wheel 49. The casing 17 is formed as a sleeve, which has been pressed or shrunk. The sleeve can be metallic. Alternatively, it can be made of carbon.

Between the permanent magnet 15 and the adjacent surfaces of the components surrounding it, there is an adhesive layer 75, which not only forms a fixed connection, but also produces a thermal coupling, in particular to the compressor wheel 49 and to the shaft 15. As the permanent magnet 15 is usually made of a brittle material, its complete coverage with adhesive 75 and other components prevents damage at high speeds by the centrifugal forces acting on the magnet 15.

The described compressor wheel arrangement 35 is a module which is already balanced before assembly with the other components of the turbocharger, so that the observance of manufacturing tolerances is facilitated, in order to achieve smooth running.

Figure 3:
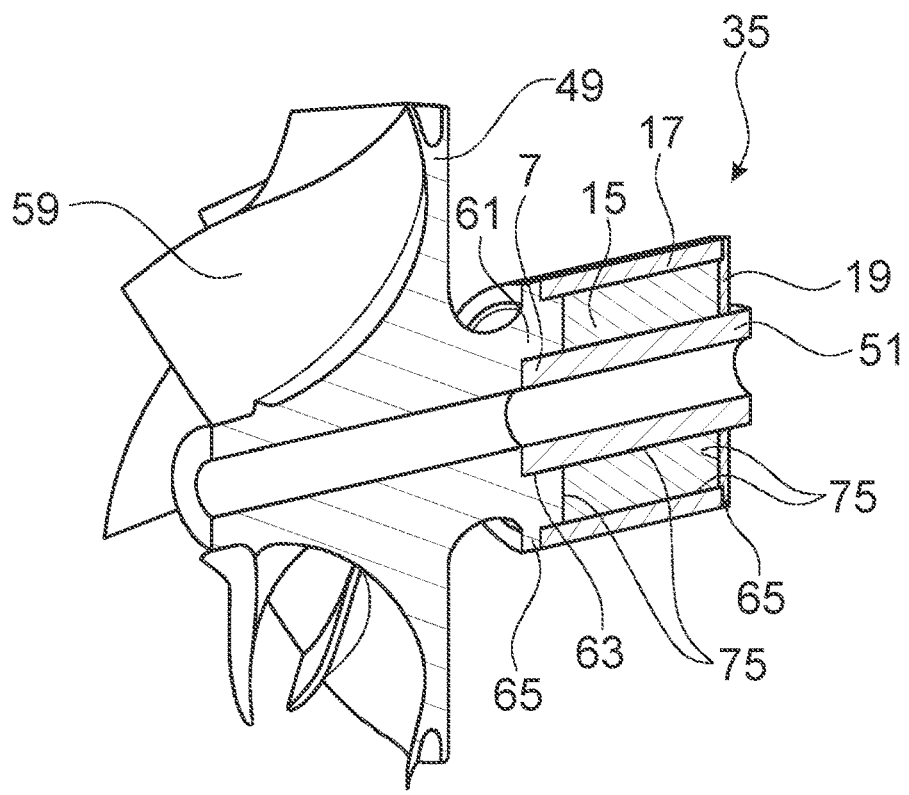

FIG. 3 shows a further exemplary embodiment of the compressor wheel arrangement 35, the casing 17 of which differs from the one previously described. The following description concentrates on this aspect, in order to avoid repetition.

The casing 17 in this exemplary embodiment is a coil instead of a sleeve. The material for the coil is fibrous or strip-shaped. So that the coil does not slip off and fully covers the outside of the magnet 15, both the compressor wheel 49 and the covering disc 19 form walls 65 in sections, which restrict the axial expansion of the coil 17. The sections control the coil-shaped casing 17 with their position and width and height, so that the coil is radially flush with the compressor wheel 49 and the covering disc 19.

In the following, the manufacture of an exemplary embodiment of a compressor wheel arrangement 35 is described.

FIG. 4 shows an exemplary embodiment of a first component 1 of a blank, from which a compressor wheel 49 with integrated shaft 51, compressor wheel-shaft device for short, for an electrically powered turbocharger can be formed by machining. The compressor wheel 49 of the compressor wheel-shaft device is formed from the first component 1.

The first component 1 comprises a first metal. In view of its later use as a compressor wheel 49, the first metal is advantageously aluminium or an aluminium alloy, so that the future compressor wheel 49 is lightweight and stable.

The first component 1 has a disc-shaped, rotationally symmetrical original form, which is referred to as a circular blank. An edge of the cross-section of the disc-shaped first component 1 rests on an external contour of the compressor wheel 49 that is later to be formed from said first component, but extends beyond it due to the removal of material in production that is still to follow. The first component 1 has a recess 3 with a circular cross section in the middle. The recess 3 extends along the rotational axis and is designed as a blind hole formed by drilling.

FIG. 5 shows an exemplary embodiment of a second component 5 of a blank, from which a compressor wheel 49 with integrated shaft 51 for an electrically powered turbocharger can be formed by machining. The shaft 51 of this compressor wheel-shaft device is formed from the second component 5.

The second component 5 is made of a second metal. In view of its later use as a shaft 51 of an electric motor, the second metal is preferably a ferromagnetic material, in particular steel. The second component 5 is combined with the first component 1 to form the blank.

The second component 5 is stick-shaped and has a cylindrical original form. An end region 7 of the second component 5, which is pressed into the recess 3 of the first component 1 during its assembly, is rounded on the front side and has external toothing, with longitudinally extending grooves 9. The grooves 9 extend into the area that is pressed into the recess 3. They can also extend beyond that. Advantageously, the grooves are not sharp-edged, rather they are rounded, so that no high notch stress occurs.

The end region 7 is designed in such a way that it can be pressed into the recess 3 of the first component 1, so that the end region 7 and the recess 3 form a press-fit connection. The bottom of the recess 3 formed as a blind hole forms a stop for the end region 7 that is pressed into it. The highest diameter of the end region 7 has an oversized fit in relation to the diameter of the recess 3. Due to the oversizing, the recess 3 is elastically widened and the end region 7 is compressed, which is further supported by the structure of the end region 7 with the grooves 9. A polygon-shaped cross section of the end region in an alternative exemplary embodiment would likewise have this assisting effect. Due to the deformations during widening and pressing, contact pressure is created, which, as a fixed, force-fitting press-fit connection between the end region 7 and the recess 3, is suited to transfer a torque from the first component 1 to the second component 5. Due to the press-fit connection, the shaft-hub connection of the future compressor wheel 49 and the shaft 51 is already formed before the completion of the compressor wheel 49 and the shaft 51, the shaft-hub connection being suited to transfer a torque form the shaft 51 to the compressor wheel 49. In an alternative exemplary embodiment, shrink-fitting is used for forming the shaft-hub connection.

FIG. 6 shows a three-dimensional depiction of an exemplary embodiment of a blank 11, formed from a first and a second component 1, 5, which are connected by a press-fit connection. From such a blank 11, a compressor wheel 49 with integrated shaft 51 for an electrically powered turbocharger is manufactured, using machining. The compressor wheel 49 is manufactured from the first component 1, and the shaft 51 is manufactured from the second component 5.

The blank 11 is a hybrid blank, made of the bonded first and second components 1, 5. The longitudinal axis 13 of the blank 11 is the symmetrical axis of the blank 11 and runs through the recess 3 and along the stick-shaped second component 5. In this exemplary embodiment, the grooves 9 of the external toothing extend over the end region 7 that is pressed into the recess 3, so that they are still visible under the pressed-on first component 1.

As the blank 11 is further processed in a milling machine, the tightly connected first and second components 1, 5 are processed together, so that the compressor wheel 49 and the shaft 51 are formed from the same blank 11, without releasing the shaft-hub connection already formed through the press-fit connection between the future shaft and the future compressor wheel in production. The shaft-hub connection is designed to transfer torque and power from the turning shaft to the compressor wheel in the completed module. The step of assembling the finished compressor wheel and finished shaft is thereby eliminated, so that dimensional variations accompanying assembly are avoided.

When pressing together the first and the second components 1, 5, asymmetries that can arise are largely eliminated by the subsequent removal of material to form the compressor wheel 49 with integrated shaft 51. As the steps of further processing the blank 11 can be done in the same clamping device, accumulating dimensional variations that would occur through several clamping steps are avoided.

Figure 7:
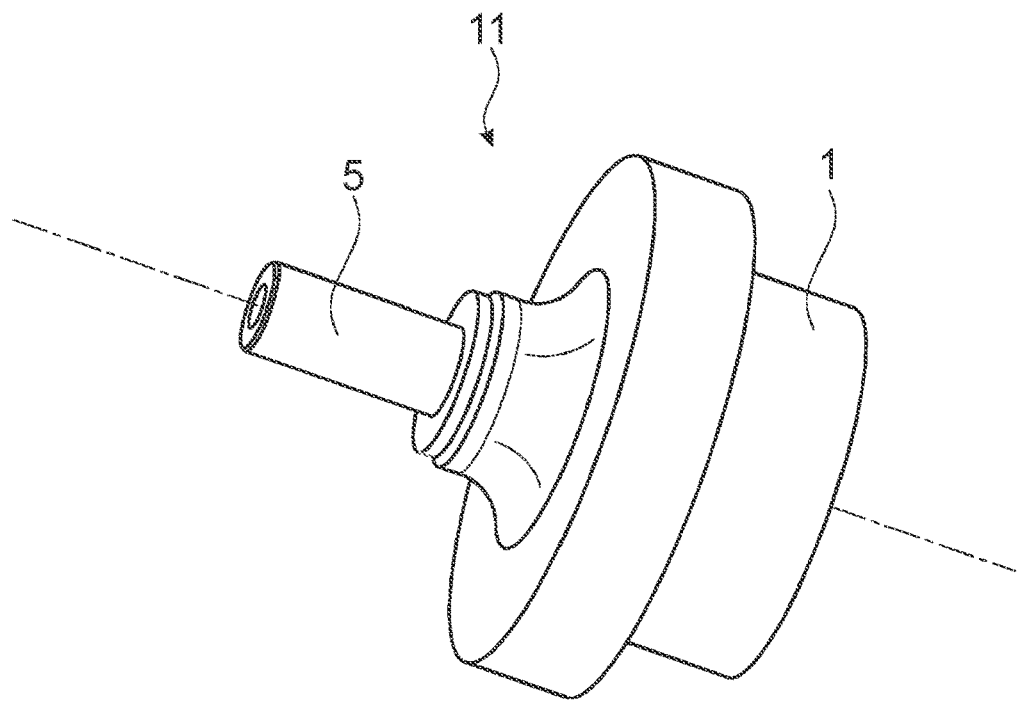

FIG. 7 shows a three-dimensional representation of an exemplary embodiment of a further processed blank, in which a hole has been bored into the end face of the second component 5 that is facing away from the first component 1, in order to form a hollow shaft. Additionally, the protruding external toothing has been removed by turning or milling, and the outer contour of the blank has been brought into the shape of the outer contour at least of the shaft 51 of the future compressor wheel-shaft device. In a subsequent milling step, blades 59 of the compressor wheel 49 are also formed. In this milling step, the outer contour of the compressor wheel 49 can still be adjusted.

Figure 8:
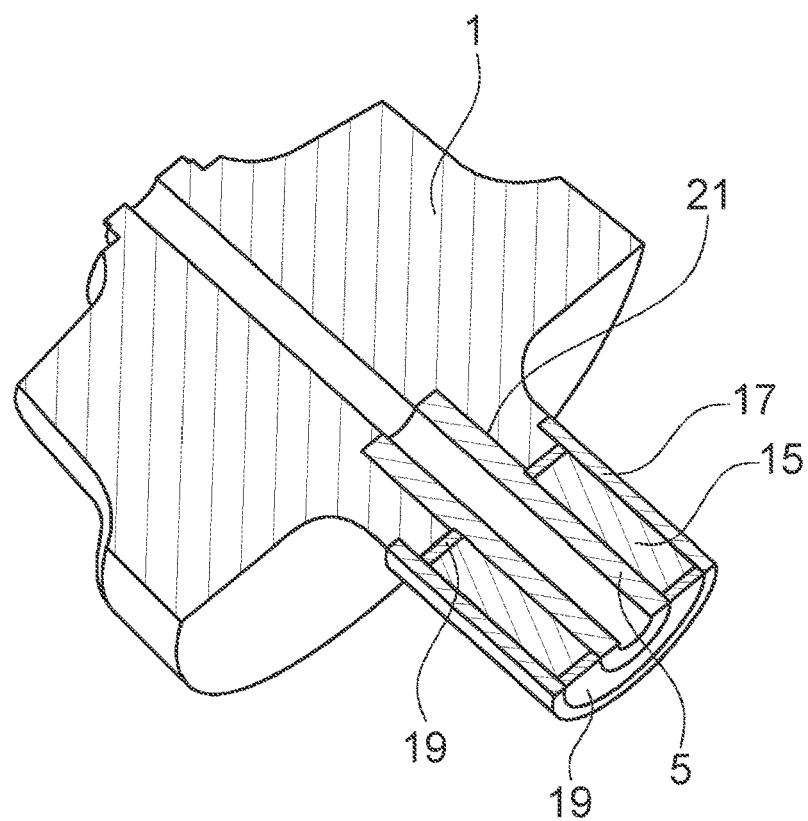

FIG. 8 shows a three-dimensional sectional representation of an exemplary embodiment of a module with the further-processed exemplary embodiment of the blank from FIG. 7 and further components for the powering of the compressor wheel 49 by electric motor, the blades of the compressor wheel not yet having been formed.

In the further-processed blank, the press-fit connection 21 of the first and the second components 1, 5 forms a fixed shaft-hub connection between the shaft and the future compressor wheel. The second component 5 has been bored out, in order to form a hollow shaft. Further components of the electric motor have already been mounted. The shaft formed from the second component 5 is arranged in a hollow cylindrical magnet 15, which is placed in a casing 17 formed as a sleeve. On the front sides of the magnet 15, washers 19 are provided. The outer washer 19 serves as a covering disc. The washer 19 between the magnet 15 and the future compressor wheel forms a thermal coupling. Alternatively, instead of the washer 19, a thermal coupling can be made by contact, adhesive or thermally conductive paste.

The manufacturing steps still to follow comprise milling, in order to form the compressor wheel 49 with its blades 59 in the module, and the balancing of the module. In an alternative production, milling takes place, in order to form the compressor wheel 49 and its blades 59 in the module, before the assembly of the magnet, the casing and the washers.

The manufacture of a further exemplary embodiment of a compressor wheel device from a hybrid blank comprises lathe machining of a contour side and machining of the future shaft. The lathe machining of the back of the compressor wheel and the boring of the future compressor wheel with integrated shaft then follow. Adhesive is applied to the shaft and/or to the magnet, and the magnet and the covering disc are joined, the latter in particular by thermal joining. The casing is assembled, for example by carbon pressing or winding. After the hardening of the adhesive and the assembly, the blades of the compressor wheel are milled and the assembled rotor is balanced with the compressor wheel arrangement. Washing then takes place. Alternatively, the step in which the blades of the compressor wheel are milled is brought forward before the assembly of the further components, that is before the application of the adhesive.

Figure 9:
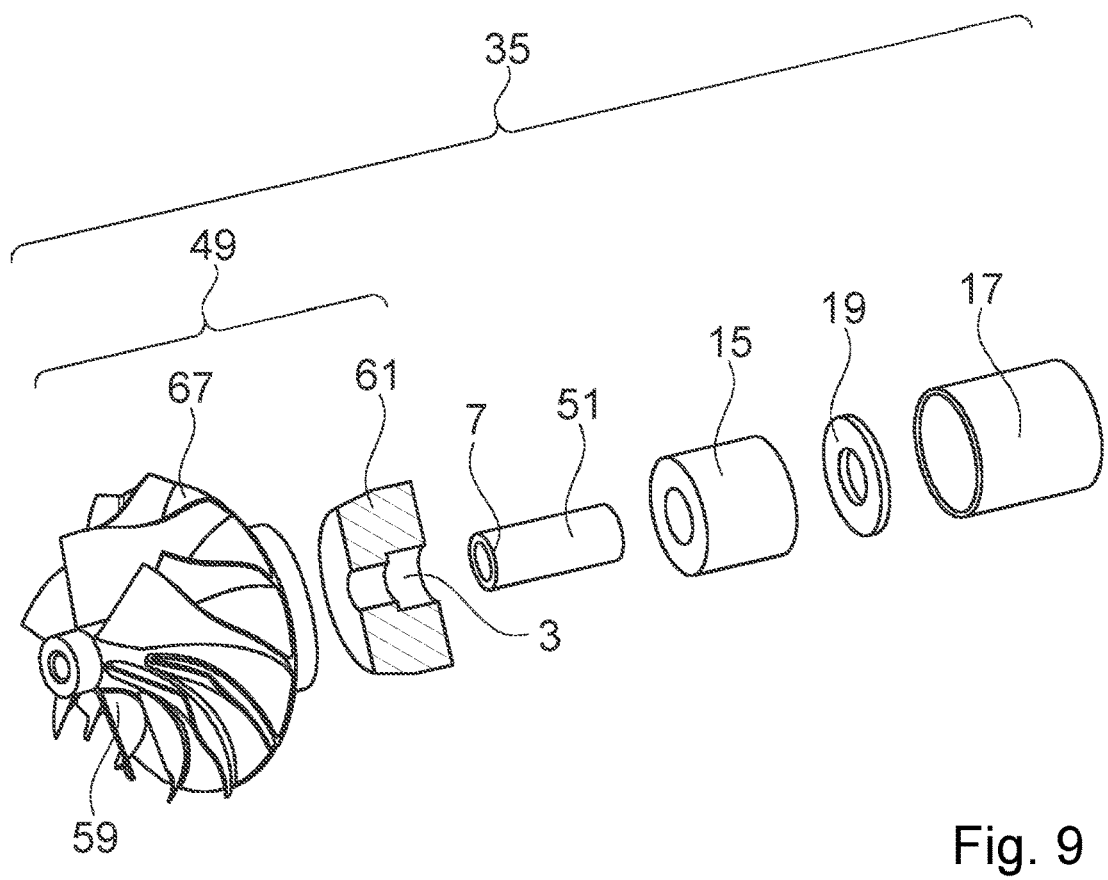

FIG. 9 shows a further exemplary embodiment of a compressor wheel arrangement in an exploded view.

The compressor wheel arrangement comprises a two-part compressor wheel 49 with a blade section 67 and a hub projection 61, which are separate components. They are made of aluminium, or an alloy comprising aluminium. The blade section 67 is the front region of the compressor wheel 49 with the blades 59. On the back side of this is provided the hub projection 61. The recess 3 of the hub projection 61 has a stepped cross-sectional widening. Both the blade section 67 and the hub projection 61 have an axial recess going all the way through them for the rotor shaft 39, which connects the blade section 67 and the hub projection 61 in the mounted compressor wheel arrangement 35, so that the blade section 67 and the hub projection 61 are thermally coupled. This can be done by contact between the components 67, 61 or with an adhesive or a thermally conductive paste between the components 67, 61.

The compressor wheel arrangement 35 further comprises a hollow shaft 51, a sleeve-shaped magnet 15, a covering disc 19 and a casing 17 formed as a carbon sleeve. Alternatively, the casing 17 can be formed as a coil. The shaft 51 has an end region 7, which engages in the recess 3 of the hub projection 61 and abuts the step, so that a shaft-hub connection is formed. The connection can be, for example, a press-fit connection or a shrink-fit connection, as described in relation to the previous exemplary embodiments. The sleeve-shaped magnet 15 and the covering disc 19 that is facing away from the compressor wheel 49 on the end face are arranged between the sleeve-shaped casing 17 and the shaft 51.

Besides the fact that the compressor wheel 49 is formed in two parts and its components 67, 61 can be separately manufactured, the compressor wheel arrangement 35 can be manufactured similarly to the exemplary embodiments described earlier. The production steps previously described in relation to the compressor wheel, however, only concern the hub projection 61 in this exemplary embodiment. The hybrid blank, from which the hub projection 61 with integrated shaft 51 is manufactured, has, in comparison to the previously described manufacture, a smaller circular blank, from which only the hub projection 61 is produced. The blade section 67 is made separately, also comprising the milling of the blades 59, and is only rotationally joined to the hub projection 61 with integrated shaft 51 and the components arranged on it during the assembly on the rotor shaft 39.

This exemplary embodiment makes the magnetisation and the joining of the magnet 15 easier, due to the smaller dimensions of the hub projection 61 with integrated shaft 51. However, due to the additional components of the two-part compressor wheel 49, it can be more difficult to adhere to manufacturing tolerances. The manufacture becomes more complicated, in particular in the assembly of the turbocharger. The balancing is also more complicated than with the one-part compressor wheel 49 that has been described in previous exemplary embodiments.

Figure 10:
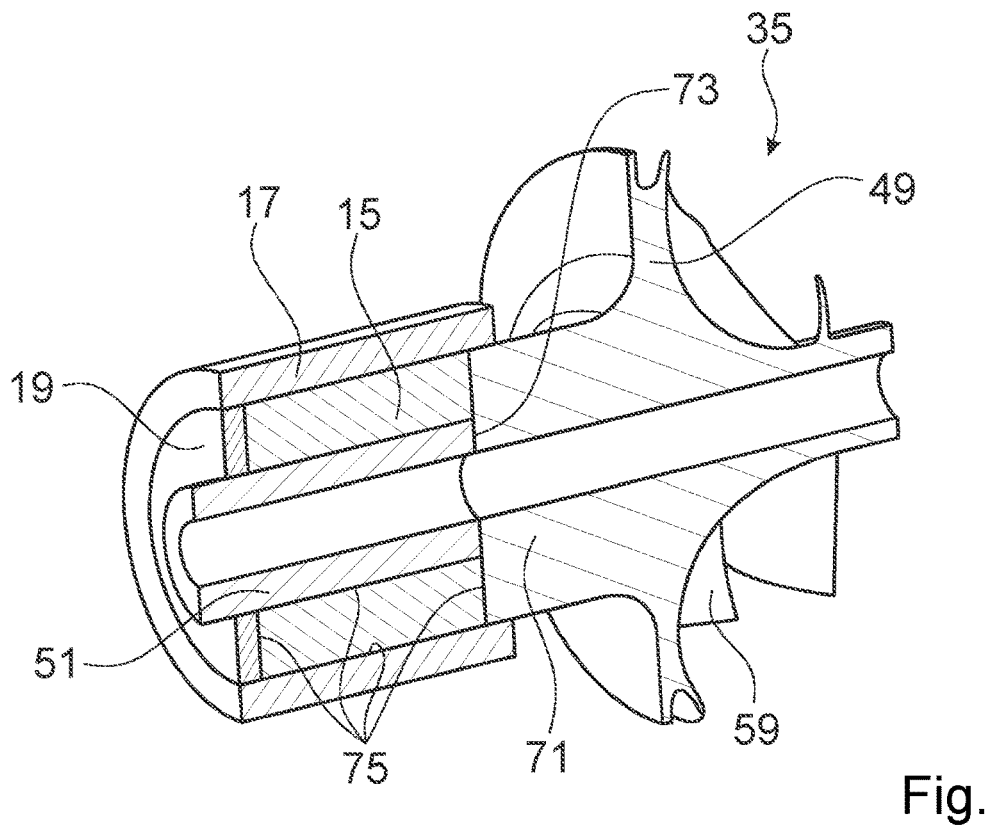

FIG. 10 shows a further exemplary embodiment of a compressor wheel arrangement 35 in a sectional view.

The one-part compressor wheel 49 made of aluminium or an alloy comprising aluminium tapers to a base 71 on the back, the diameter of which corresponds to that of the magnet 15. The hollow shaft 51 is connected to the base 71 by a friction-welded connection 73. The sleeve-shaped magnet 15 and the front covering disc 19 are arranged on the shaft 51 and are surrounded on the outside by the casing 17, which extends beyond the base 71. The casing 17 can be formed as a sleeve shape or as a coil. Between the magnet 15 and the other components, in particular the base of the compressor wheel, there is an adhesive layer 75 which serves as a thermal coupling agent.

The manufacture of this exemplary embodiment occurs similarly to what has been described previously; however, the blank for the machining manufacture is formed by friction welding between a first and second component.

Lathe machining of the blank then takes place, both for the round blank as the first component and also for the second component connected to it. An adhesive 75 is then applied to the shaft 51 and the sleeve-shaped magnet 15 is attached. The covering disc 19 is attached, for example by thermal joining. Then the casing 17, which is formed as a sleeve, is attached. After the adhesive 75 has hardened, the blades 59 of the compressor wheel 49 are milled. The balancing takes place after the assembly of the compressor wheel arrangement 35 and rotor shaft 39 Then the washing takes place.

Although the present invention has been described above and is defined in the accompanying claims, it should be understood that the invention can also alternatively be defined in compliance with the following embodiment:

Blank (11) for the machining manufacture of a compressor wheel with integrated shaft for an electrically powered turbocharger, comprising a first component (1) made of a first metallic material with a recess (3), in which an end region (7) of a second component (5), made of a second metallic material, engages, so that the end region (7) and the recess (3) form a press-fit connection (21) or shrink-fit connection and the second component (5) extends along a longitudinal axis (13) of the blank (11), which also runs through the recess (3).

1. Blank (11) according to embodiment 1, wherein the first component (1) has an original form that is rotationally symmetrical relative to the longitudinal axis.
2. Blank (11) according to embodiment 1 or 2, wherein the first component (1) has a disc-shaped original form, the maximum diameter of which is larger than its maximum thickness.
3. Blank (11) according to one of the preceding embodiments, wherein an edge of the cross-section of the first component (1) has a curved shape, which is based on the external contour of the compressor wheel to be manufactured.
4. Blank (11) according to one of the preceding embodiments, wherein the second component (5) is stick-shaped and its end region (7) is rounded on the front face.
5. Blank (11) according to one of the preceding embodiments, wherein the end region (7) is a structure with elevations and/or indentations, in particular a structure with grooves (9).
6. Blank (11) according to one of the preceding embodiments, wherein the end region (7) has an external toothing with longitudinal grooves (9).
7. Blank (11) according to one of the preceding embodiments, wherein the end region (7) has a polygon-shaped cross section.
8. Blank (11) according to one of the preceding embodiments, wherein the second component (5) is steel.
9. Blank (11) according to one of the preceding embodiments, wherein the first component (1) comprises aluminium.
10. Compressor wheel with integrated shaft for an electrically powered turbocharger, which is machined out of the blank (11) according to one of the preceding claims, so that the press-fit connection (21) or the shrink-fit connection forms a shaft-hub connection between the shaft, made of the second material, and the compressor wheel, made of the first material.
11. Electrically powered turbocharger having a compressor wheel with integrated shaft, according to embodiment 11.
12. Method for the manufacture of a compressor wheel with integrated shaft for an electrically powered turbocharger, having the steps:

formation of a blank (11) by assembling a first component (1), made of a first metallic material, with a recess (3) and a second component (5), made of a second metallic material, which has an end region (7), so that the end region (7) that engages in the recess (3) and the recess (3) form a press-fit connection (21) or a shrink-fit connection, and the second component (5) extends along a longitudinal axis (13) of the blank (11), said axis also running through the recess (3), and processing of the blank (11) by machining methods, in the same clamping device as used for the manufacture of the compressor wheel with integrated shaft for an electrically powered turbocharger.

Alternatively or additionally, the above embodiments can also refer to a hub projection with integrated shaft of a compressor wheel with at least two parts, instead of to the compressor wheel with integrated shaft.

The features above and those specified in the claims, as well as those that can be taken from the illustrations, can advantageously be implemented both individually and in different combinations. The invention is not limited to the described exemplary embodiments, but rather it is modifiable in a number of ways, within the scope of those skilled in the art.

REFERENCE NUMERALS 1 first component
3 recess
5 second component
7 end region
9 groove
11 blank
13 longitudinal axis
15 magnet
17 sleeve
19 washer
21 press-fit connection
31 rotor
33 bearing device
35 compressor wheel arrangement
37 turbine wheel
39 rotor shaft
41 bearing housing
43 radial bearing
45 axial bearing
47 oil feed
49 compressor wheel
50 shaft
53 recess
55 electric motor
57 stator
59 blade
61 hub projection
63 shaft-hub connection
65 wall
67 blade section
71 base
73 friction-welded connection
75 adhesive

What is claimed is:

1. A compressor wheel arrangement for an electrically powered turbocharger, which can be connected to a rotor shaft of the turbocharger, the compressor wheel arrangement comprising:
- a compressor wheel made of a first metallic material and formed of one part, the compressor wheel defining a recess having a step;
- a shaft made of a second metallic material, the shaft including:
  - a first shaft section including an end of the shaft engaged with the recess of the compressor wheel and abutting the step to form a shaft-hub connection to connect the shaft to the compressor wheel, and
  - a second shaft section that extends behind the compressor wheel between a casing and the first shaft section; and
- at least one permanent magnet non-rotatably arranged on the second shaft section in a ring-shaped area around the second shaft section, wherein the at least one permanent magnet is thermally coupled with the compressor wheel.

2. The compressor wheel arrangement according to claim 1, wherein the shaft is connected to the compressor wheel by a friction-welded connection.

3. The compressor wheel arrangement according to claim 1, wherein the shaft-hub connection is formed as a press-fit connection or as a shrink-fit connection.

4. The compressor wheel arrangement according to claim 1, wherein the first shaft section, at the end of the shaft, has a structure with elevations and/or indentations.

5. The compressor wheel arrangement according to claim 1, wherein the shaft comprises a ferromagnetic material, and/or the compressor wheel comprises aluminium.

6. The compressor wheel arrangement according to claim 1, wherein the at least one permanent magnet is formed as a magnetic sleeve.

7. The compressor wheel arrangement according to claim 1, wherein an adhesive layer is arranged between the at least one permanent magnet and the shaft, as well as between the at least one permanent magnet and the compressor wheel.

8. The compressor wheel arrangement according to claim 1, wherein the casing is formed as a coil or as a sleeve.

9. The compressor wheel arrangement according to claim 1, wherein the shaft comprises steel and the compressor wheel comprises aluminium.

* * * * *